United States Patent
Kim

(10) Patent No.: US 11,965,372 B2
(45) Date of Patent: Apr. 23, 2024

(54) DOOR CONTROL SYSTEM AND METHOD FOR VEHICLE

(71) Applicants: Hyundai Motor Company, Seoul (KR); Kia Corporation, Seoul (KR)

(72) Inventor: Ki Eun Kim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 238 days.

(21) Appl. No.: 17/736,534

(22) Filed: May 4, 2022

(65) Prior Publication Data

US 2023/0062258 A1 Mar. 2, 2023

(30) Foreign Application Priority Data

Sep. 1, 2021 (KR) .................. 10-2021-0116063

(51) Int. Cl.
*B60R 25/24* (2013.01)
*B60R 16/00* (2006.01)
*E05F 15/40* (2015.01)
*E05F 15/77* (2015.01)

(52) U.S. Cl.
CPC ............ *E05F 15/40* (2015.01); *B60R 16/005* (2013.01); *E05F 15/77* (2015.01)

(58) Field of Classification Search
CPC ...... E05F 15/40; E05F 15/659; B60R 16/005; B60R 25/24
See application file for complete search history.

(56) References Cited

U.S. PATENT DOCUMENTS

2008/0184623 A1* 8/2008 Heigl .................... E05F 15/659 49/31
2021/0164283 A1* 6/2021 Tamura .................. B60R 25/24

FOREIGN PATENT DOCUMENTS

KR 19980044353 U 9/1998

\* cited by examiner

*Primary Examiner* — Cortez M Cook
(74) *Attorney, Agent, or Firm* — Slater Matsil, LLP

(57) ABSTRACT

An embodiment door control method for a vehicle, wherein the vehicle includes a switch for opening or closing a door of the vehicle, includes receiving a first close input of the door of the vehicle from the switch, determining whether a keep-open mode of the door is in an ON state or an OFF state, wherein the keep-open mode is determined based on a user input, and controlling opening or closing of the door based on the ON state or the OFF state of the keep-open mode.

20 Claims, 3 Drawing Sheets

DOOR CONTROL SYSTEM AND METHOD FOR VEHICLE

CROSS-REFERENCE TO RELATED APPLICATIONS

This application claims the benefit of Korean Patent Application No. 10-2021-0116063, filed on Sep. 1, 2021, which application is hereby incorporated herein by reference.

TECHNICAL FIELD

The present disclosure relates to a door control system and method for a vehicle.

BACKGROUND

A camping activity, where people can rest in nature, has received a lot of attention from the old days as a leisure activity. Conventionally, camping meant spending time at a mountain, a beach, etc., with a tent. Recently, auto-camping using a sports utility vehicle (SUV), a recreational vehicle (RV), or the like, is also drawing attention.

In auto-camping, campers may enjoy camping with a tent, tarp, or lantern hung on a door or a tailgate of a vehicle. Camping equipment, food, etc., may be placed on an extension deck or an outdoor multi-level luggage board in a trunk room with the door or the tailgate opened.

In a vehicle with a power door, for example, a power tailgate on the rear of the vehicle can be automatically opened or closed by operating a remote key of the vehicle, such as a smart key, or a button provided on the tailgate side. An accident may occur if the smart key or the tailgate button is incorrectly operated by the user's negligence, etc., during camping with the tailgate opened. The tailgate closes automatically, which can injure people or damage objects.

To prevent such safety accidents, there is a need for a countermeasure enabling the door, such as the tailgate of the vehicle, to be kept open in spite of misoperation of the smart key or the button.

The above information disclosed in this Background section is only for enhancement of understanding of the background of the disclosure and accordingly it may include information that does not form the prior art that is already known to a person of ordinary skill in the art.

Korean Utility Model Registration Publication No. 1998-044353 (published on Sep. 25, 1998) provides information related to the subject matter of the present disclosure.

SUMMARY

The present disclosure relates to a door control system and method for a vehicle. Particular embodiments relate to a door control system and method for controlling the opening or closing of a door.

Embodiments of the present disclosure can solve problems associated with the related art, and an embodiment of the present disclosure provides a door control system and method for a vehicle enabling a door for a vehicle to maintain an opened state as necessary.

The embodiments of the present disclosure are not limited to the aforementioned embodiment, and other embodiments not mentioned can be clearly understood by those skilled in the art to which the present disclosure pertains (hereinafter, referred to as 'those skilled in the art') from the following description.

The features of embodiments of the present disclosure for providing aspects of the present disclosure and performing functions of embodiments of the present disclosure to be described later are as follows.

According to an embodiment of the present invention, a vehicle comprises one or more switches configured to open or close a door of the vehicle, a controller configured to control the door such that the door is opened or closed in accordance with operation of any one of the switches, an interaction unit configured to communicate with the controller, and a memory unit configured to store a series of steps executable by the controller to control the door. The steps include receiving a first close input of the door of the vehicle from the switch, determining whether a keep-open mode of the door is in an ON state, wherein the keep-open mode is set by the interaction unit, and controlling opening or closing of the door depending upon a state of the keep-open mode.

Embodiments of the present disclosure provide the door control system and method for the vehicle that enable the door for the vehicle to maintain the opened state as necessary.

Embodiments of the present disclosure provide the door control system and method for the vehicle that can provide user convenience and prevent a safety accident.

Embodiments of the present disclosure provide the door control system and method for the vehicle that can improve merchantability.

The embodiments of the present disclosure are not limited to the aforementioned embodiments, and other embodiments not mentioned can be clearly recognized by those skilled in the art from the following description.

It is understood that the term "automotive" or "vehicular" or other similar term as used herein is inclusive of motor vehicles in general such as passenger automobiles including spoils utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The above and other features of embodiments of the disclosure are discussed infra.

BRIEF DESCRIPTION OF THE DRAWINGS

The above and other features of embodiments of the present disclosure will now be described in detail with reference to certain exemplary examples thereof illustrated in the accompanying drawings which are given herein below by way of illustration only, and thus are not limitative of the present disclosure, and wherein.

Figure 1:
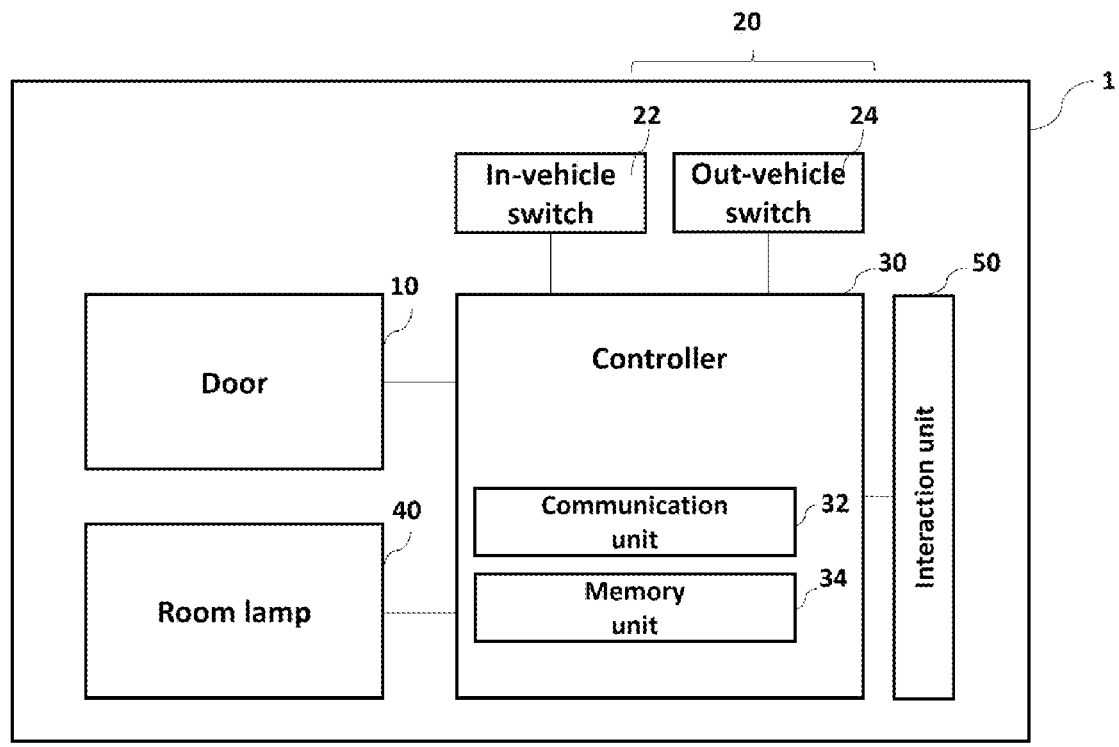
FIG. 1 shows a door control system according to some exemplary embodiments of the present disclosure.

It should be understood that the appended drawings are not necessarily to scale, presenting a somewhat simplified representation of various preferred features illustrative of the basic principles of the disclosure. The specific design features of embodiments of the present disclosure as disclosed herein, including, for example, specific dimensions, orientations, locations, and shapes will be determined in part by the particular intended application and use environment.

In the figures, reference numbers refer to the same or equivalent sections of embodiments of the present disclosure throughout the several figures of the drawings.

DETAILED DESCRIPTION OF ILLUSTRATIVE EMBODIMENTS

Specific structural or functional descriptions presented in exemplary embodiments of the present disclosure are only exemplified for the purpose of describing the exemplary embodiments according to the concepts of the present disclosure, and the exemplary embodiments according to the concepts of the present disclosure may be carried out in various forms. Further, the exemplary embodiments should not be interpreted as being limited to the exemplary embodiments described in the present specification, and should be understood as including all modifications, equivalents, and substitutes included in the spirit and technical scope of the present disclosure.

Meanwhile, in embodiments of the present disclosure, terms such as first and/or second may be used to describe various components, but the components are not limited to the terms. The terms are used only for the purpose of distinguishing one component from other components. For example, a first component may be referred to as a second component, and similarly, the second component may also be referred to as the first component, without departing from the scope according to the concepts of the present disclosure.

When a component is referred to as being "connected" or "coupled" to another component, it should be understood that the components may be directly connected or coupled to each other, but still another component may also exist therebetween. On the other hand, when a component is referred to as being "directly connected to" or "in direct contact with" another component, it should be understood that another component does not exist therebetween. Other expressions for describing the relationship between components, that is, expressions such as "between" and "directly between" or "adjacent to" and "directly adjacent to" also should be interpreted in the same manner.

Throughout the specification, the same reference numerals refer to the same elements. Meanwhile, the terms used in the present specification are for the purpose of describing the exemplary embodiments and are not intended to limit the present disclosure. In the present specification, the singular form also includes the plural form unless otherwise specified in the phrase. "Comprises" and/or "comprising" used in the specification specifies the presence of the mentioned component, step, operation, and/or element, and does not exclude the presence or the addition of one or more other components, steps, operations, and/or elements.

Hereinafter, embodiments of the present disclosure will be described in detail with reference to the accompanying drawings.

FIG. 1 shows an exemplary vehicle 1 to which a door control method according to embodiments of the present disclosure may be applied.

The vehicle 1 includes a door 10. The door 10 means an opening portion communicating the indoor and outdoor of the vehicle 1. As a non-limiting example, the door 10 may include a tailgate provided on the rear of the vehicle or a door provided on a side of the vehicle. Further, the door 10 may be opened in various methods. According to one embodiment of the present disclosure, the door 10 is rotatably coupled to the vehicle to be opened or closed. According to another embodiment of the present disclosure, the door 10 is slidably coupled to the vehicle to be opened or closed. Hereinafter, as the door 10, the tailgate rotatably coupled to an upper portion of the rear of the vehicle to be opened or closed will be mainly described as an example, but the door 10 is not limited thereto and the disclosure may be applied to all doors provided in the vehicle.

According to embodiments of the present disclosure, the door 10 includes a door that is electrically opened or closed. As a non-limiting example, the door 10 may be a power tailgate or a power sliding door.

A door control system according to embodiments of the present disclosure includes at least one switch 20. The door 10 that is electrically opened or closed is configured to be opened or closed by an operation of the switch 20. The switch 20 may include at least one of an in-vehicle switch 22 and an out-vehicle switch 24.

In an embodiment of the present disclosure, the in-vehicle switch 22 may be provided on an instrument cluster inside the vehicle, etc., which is a user interface between the vehicle and a user. The user may turn on or off the in-vehicle switch 22 around the cluster provided in the vehicle. In another embodiment of the present disclosure, the in-vehicle switch 22 may be a button provided on the door 10 itself or around the door 10. The switch 20 may be a push button.

In an embodiment of the present disclosure, the out-vehicle switch 24 includes a switch that may open or close the door 10 by wirelessly communicating with the vehicle 1. As a non-limiting example, the out-vehicle switch 24 may be a key of the vehicle including a smart key wirelessly connected and exclusively communicating with a specific vehicle. As another non-limiting example, the out-vehicle switch 24 may be a mobile device that may nonexclusively communicate with the vehicle 1, such as a smart phone or a tablet device wirelessly connected to the vehicle 1. For example, when the mobile device and the vehicle 1 are paired, the mobile device may be configured to open or close the door 10 through a designated application.

The door control system according to embodiments of the present disclosure includes a controller 30. The controller 30 may be configured to receive an input from at least one switch 20 and to allow the door 10 to be operated based on the received input. According to an embodiment of the present disclosure, the controller 30 includes a communication unit 32 and a memory unit 34.

The controller 30 is configured to communicate with the at least one switch 20 through the communication unit 32. The controller 30 may receive input information of the in-vehicle switch 22 through the communication unit 32. Further, the controller 30 may be wirelessly connected to the out-vehicle switch 24, such as the smart key or the mobile device, to receive the input information through the communication unit 32. As a communication method between the controller 30 and the switch 20, a known connection method may be used and, therefore, the description thereof will be omitted.

The memory unit 34 is configured to store instructions executable by the controller 30. The controller 30 is configured to execute the instructions stored in the memory unit 34 with respect to a specific input by the switch 20 to perform a series of steps.

The controller 30 is configured to communicate with an interaction unit 50. A control mode of the door may be changed based on data input by the interaction unit 50. In an embodiment, the interaction unit 50 is a user interface provided on the instrument cluster of the vehicle to enable the user to change various settings of the vehicle. In another embodiment, the interaction unit 50 may be the mobile device configured to communicate with the controller 30 of the vehicle. When the user selects a specific setting through the interaction unit 50, the controller 30 may be operated based thereon. For example, the interaction unit 50 may be provided with a settings window of a keep-open mode to be described later.

A vehicle interior is provided with a room lamp 40. As a non-limiting example, the room lamp 40 may be provided on a rear portion of a headlining inside the vehicle. The room lamp 40 is provided to secure visibility inside the vehicle 1. The room lamp 40 may maintain the turned-on state if the door 10 is opened. According to embodiments of the present disclosure, the room lamp 40 may be turned on or off and the brightness thereof may be adjusted based on the user's input, more specifically, the user's input through the interaction unit 50. As described below, for example, the user's selection about the room lamp 40 may be input through the interaction unit 50, and the controller 30 may control the room lamp 40 depending upon the user's input.

Figure 2:
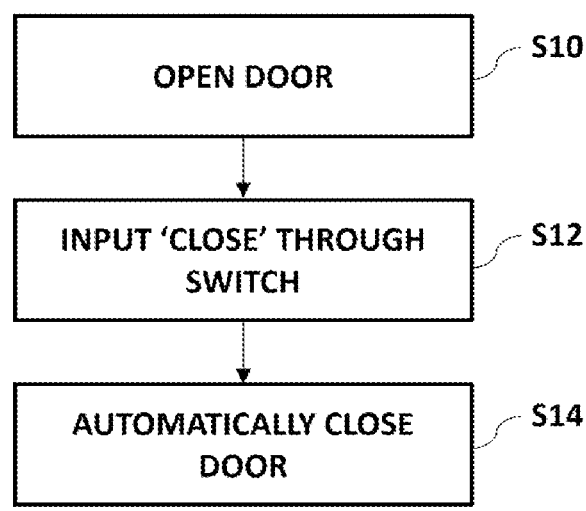
FIG. 2 shows a flowchart of opening or closing a power door for a vehicle.

Basically, a closing operation of the power door of the vehicle is shown in a flowchart of FIG. 2. When the user opens the door 10 through the switch 20, the door 10 is maintained in the opened state (S10). When a closing input is received through the switch 20 to close the door 10 (S12), the door 10 is automatically closed (S14). Specifically, the controller 30 receives an opening input by the user through the switch 20. The opening input by the user may also be delivered to the controller 30 through the input of the out-vehicle switch 24, such as the smart key, and the opening input may be generated by the pressing of the in-vehicle switch 22 provided around the door 10 or the cluster. When there is no user's additional input after the door 10 is opened, the door 10 is maintained in the opened state. At this time, when the user presses the in-vehicle switch 22 or the out-vehicle switch 24 to close the door 10, the controller 30 receives the closing input. Based on the received closing input, the controller 30 drives a mechanism, e.g., driving spindles of the tailgate, such that the door 10 is closed. As described above, if food and equipment are placed around the door 10 or a person is between the door 10 and the vehicle 1 with the tailgate or the door 10 opened like during camping, the door 10 is automatically closed once the closing input is received by the switch, such as the smart key or the button. This can result in injuring the person or damaging the vehicle, the surrounding objects, etc. Embodiments of the present disclosure can solve such a problem by applying an additional logic when controlling opening or closing of the door.

Hereinafter, a door control method according to the door control system according to embodiments of the present disclosure will be described.

Figure 3:
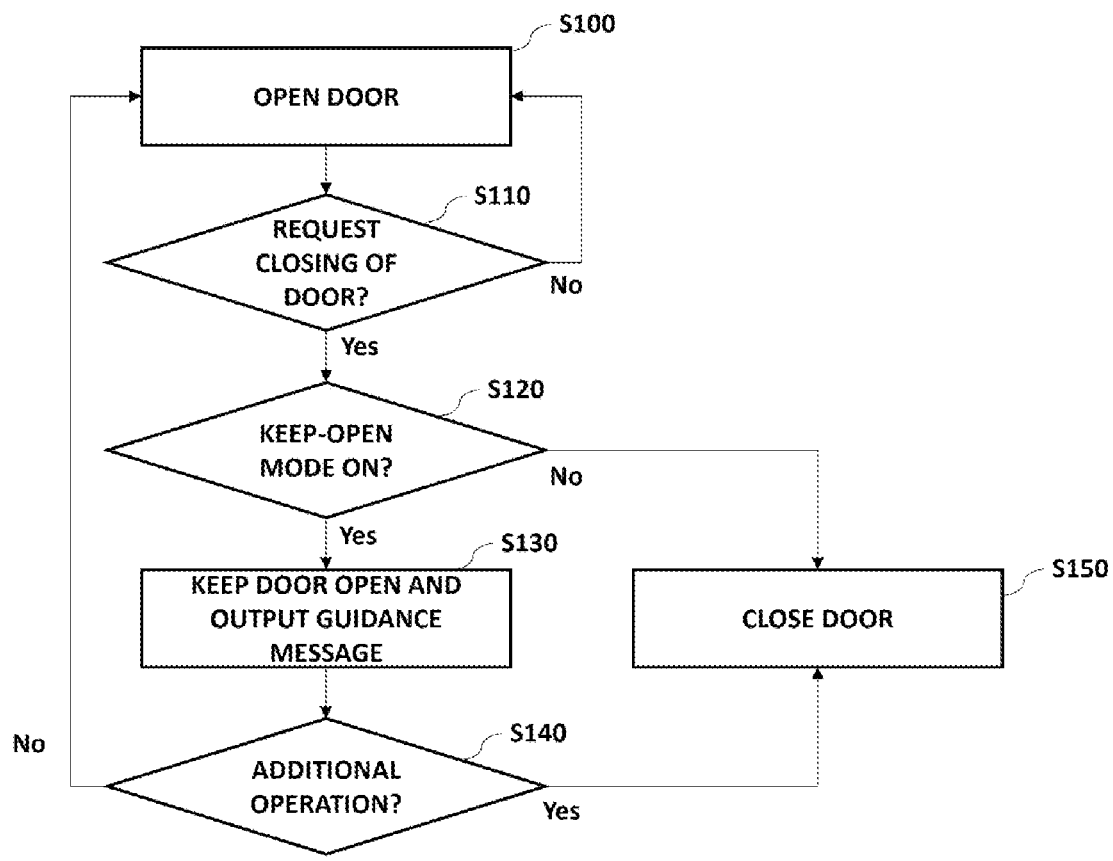
FIG. 3 shows a door control method according to some exemplary embodiments of the present disclosure.

As shown in FIG. 3, the door 10 is opened through the user's operation of the switch 20 (S100). When there is no additional input through the switch, the door 10 is maintained in the opened state.

The closing of the door 10 is input to the controller 30 through the switch 20 (S110). According to embodiments of the present invention, the keep-open mode may be set to prevent the door 10 from being accidentally closed. For instance, although the user does not intend to close the door 10, the user may operate the switch 20 negligently or incorrectly.

Figure 4:
FIG. 4 shows an exemplary output screen of an interaction unit on which a keep-open mode is selected.

Therefore, the controller determines whether the keep-open mode is in an ON state if the door closing request is input (S120). As described above, setting the keep-open mode may be implemented through the interaction unit 50. Alternatively, setting the keep-open mode may also be configured to be implemented through the mobile device communicable with the vehicle. The keep-open mode refers to a settings mode in which the door 10 is not closed immediately even when closing is input through the switch 20 in the opened state. Therefore, it is possible to prevent the door 10 from closing due to the incorrect operation in camping, etc. FIG. 4 depicts an exemplary display when the user selects the settings related to the door 10 on the interaction unit 50. FIG. 4 shows a power tailgate as an example. To prevent the opened door 10 from being accidentally closed in camping, etc., the user can select the keep-open mode. The input of the selected keep-open mode is received by the controller.

When receiving the closing input by the switch 20 when the keep-open mode is selected, the controller 30 first maintains the door 10 in the opened state (S130). At the same time, the controller outputs a guidance message to the interaction unit 50, the mobile device, etc. (S130). The message may be a voice message, a text message, or a combination thereof. For example, the message may be "In the keep-open mode. To cancel the keep-open mode, please press and hold the switch 20 for 3 seconds." In other words, the controller outputs a preset message.

If there is no input by the user after the preset message is output, the door 10 is maintained in the opened state.

Conversely, when the user acts on output preset message after the message is output, the controller 30 closes the door 10 in accordance with the user's closing input. In other words, the controller 30 determines whether there is an additional operation by the user after the message is output (S140). In the above example, when the user presses and holds the switch 20 for 3 seconds and then presses the closing button again through the operation of the switch 20, then the controller 30 closes the door 10. If the user presses and holds the switch 20 for 3 seconds to cancel the keep-open mode, a message which notifies cancellation of the keep-open mode may also be output to the interaction unit 50 or the mobile device. Then the user may operate the switch 20 to close the door 10 (S150). In other words, when the user presses the switch 20 for 3 seconds and then the keep-open mode is canceled, the user may make the closing input by manipulating the switch 20 again to close the door 10.

Figure 5:
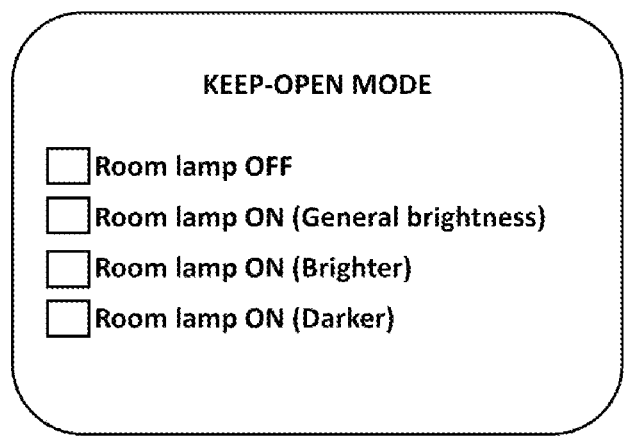
FIG. 5 shows an exemplary output screen of the keep-open mode.

Further, according to embodiments of the present disclosure, the controller 30 is configured to adjust the ON/OFF status and brightness of the room lamp 40. As shown in FIG. 5, if the keep-open mode is selected, the interaction unit 50 or the mobile device can display a selection window shown in FIG. 5. In an embodiment, more brightness levels may also be included than in a case of FIG. 5. Conventionally, if the tailgate, etc., is in the opened state, the room lamp stays on. There has been a problem in that a battery of the vehicle may be drained when the room lamp 40 is turned on for a long time. Embodiments of the present disclosure can solve a no-start problem due to the draining of the battery by providing the above function.

The controller 30 according to embodiments of the present disclosure may be a single controller and may comprise multiple controllers. For example, one controller may be configured to control opening or closing of the door or the operation of the room lamp. Further, multiple controllers may also control the opening or closing of the door and the operation of the room lamp, respectively.

According to embodiments of the present disclosure, it is possible to implement the function by adding only the logic without increasing cost or weight caused by addition of the physical structure, thereby economically improving the merchantability of the vehicle.

Further, according to embodiments of the present disclosure, it is possible to prevent a safety accident that can occur in relation to the unintentional closing of the conventional tailgate.

The aforementioned present disclosure is not limited to the aforementioned exemplary embodiments and the accompanying drawings, and it will be apparent by those skilled in the art to which the present disclosure pertains that various substitutions, modifications, and changes can be made without departing from the technical spirit of the present disclosure.

What is claimed is:

1. A door control method for a vehicle, wherein the vehicle comprises a switch for opening or closing a door of the vehicle, the method comprising:
   receiving a first close input of the door of the vehicle from the switch;
   determining whether a keep-open mode of the door is in an ON state or an OFF state, wherein the keep-open mode is determined based on a user input; and
   controlling opening or closing of the door based on the ON state or the OFF state of the keep-open mode.

2. The method of claim 1, wherein controlling the opening or closing comprises maintaining an open state of the door in response to the keep-open mode being in the ON state.

3. The method of claim 2, wherein controlling the opening or closing further comprises requesting an additional operation to change the keep-open mode to the OFF state.

4. The method of claim 3, wherein controlling the opening or closing further comprises closing the door in response to receiving an input of the additional operation.

5. The method of claim 4, wherein controlling the opening or closing further comprises closing the door in response to an input of a second close input through the switch after the keep-open mode is changed to the OFF state.

6. The method of claim 3, wherein controlling the opening or closing further comprises keeping the door open in response to not receiving an input of the additional operation.

7. The method of claim 3, wherein requesting the additional operation to change the keep-open mode to the OFF state comprises outputting a guidance message to a user requesting the additional operation of the switch for confirming the first close input of the door.

8. The method of claim 7, wherein the additional operation comprises operating the switch for a preset time.

9. The method of claim 1, wherein the switch is connected to a controller for communicating wirelessly, the switch comprising a non-exclusive mobile device connected to the controller wirelessly or an exclusive smart device connected to the controller wirelessly.

10. The method of claim 1, further comprising:
    in response to the keep-open mode being in the ON state and the door being opened, entering an input value on an operation of a room lamp provided in the vehicle; and
    controlling the operation of the room lamp based on the input value.

11. A system for controlling a door of a vehicle, wherein the system comprises:
    a switch configured to direct opening or closing of the door of the vehicle;
    a controller configured to control the door such that the door is opened or closed in accordance with operation of the switch;
    an interaction unit configured to communicate with the controller; and
    a memory unit configured to store a series of steps executable by the controller to control the door, wherein the controller is configured to:
      receive a first close input of the door of the vehicle from the switch;
      determine whether a keep-open mode of the door is in an ON state or an OFF state, wherein the keep-open mode is set by the interaction unit; and
      control the opening or closing of the door based on the ON state or the OFF state of the keep-open mode.

12. The system of claim 11, wherein the controller is configured to:
    control to maintain an open state of the door in response to a determination that the keep-open mode is in the ON state; and
    request an additional operation to change the keep-open mode to the OFF state.

13. The system of claim 12, wherein the controller is configured to:
    receive an input of the additional operation; and
    close the door in response to receiving an input of a second close input through the switch after the keep-open mode is changed to the OFF state by the input of the additional operation.

14. The system of claim 12, wherein the controller is configured to keep the door open in response to not receiving an input of the additional operation.

15. The system of claim 11, wherein the switch comprises a switch configured to communicate with the controller in a wired connection.

16. The system of claim 11, wherein the switch comprises a switch connected to the controller and configured to communicate wirelessly.

17. The system of claim 16, wherein the switch comprises a non-exclusive mobile device connected to the controller wirelessly.

18. The system of claim 16, wherein the switch comprises an exclusive smart device connected to the controller wirelessly.

19. The system of claim 11, wherein the switch comprises a button provided around the door or around a cluster in the vehicle.

20. The system of claim 11, further comprising a room lamp provided in the vehicle, wherein in response to the keep-open mode being in the ON state and the door being opened, the interaction unit is configured to enter an input value on an operation of the room lamp provided in the vehicle and the controller is configured to control the operation of the room lamp based on the input value.

* * * * *